United States Patent Office 2,807,606
Patented Sept. 24, 1957

2,807,606

CONDENSATION POLYMERS AND INTERMEDIATES THEREFOR

James Lincoln, London, England, assignor to British Celanese Limited, a corporation of Great Britain No Drawing. Application June 3, 1953,
Serial No. 359,439

Claims priority, application Great Britain June 10, 1952

15 Claims. (Cl. 260—75)

This invention relates to improvements in polymers and intermediates therefor.

In the past there have been produced broadly two types of synthetic polymer, one in which the molecule is linear or substantially linear, the polymer being soluble in appropriate solvents and in most cases fusible, and the other kind cross-linked polymers which are insoluble and infusible. The first kind is exemplified by the nylons, made for example from polymethylene diamines and polymethylene dicarboxylic acids or from amino-polymethylene carboxylic acids or their lactams, and by the aromatic polyesters such as that from terephthalic acid and ethylene glycol. Both these types of polymers have been developed principally with a view to the production of fibres therefrom. The cross-linked type of polymer is exemplified by the alkyd resins, for example the resin obtained from glycerol and phthalic anhydride, by the phenol aldehyde resins, for example that obtained from phenol itself and formaldehyde, and by the urea and thiourea formaldehyde resins and the melamine formaldehyde resins. While it is possible in the production of cross-linked polymers to stop the condensation at an intermediate stage such that the product is still soluble, e. g. in water or alcohol in the case of a phenol aldehyde resin, nevertheless this intermediate product is potentially reactive and, given the appropriate conditions, will condense to a cross-linked polymer which is infusible and insoluble and cannot be moulded.

The present invention relates to an entirely new type of polymer produced by the utilization of an entirely new type of polymer intermediate. These polymer intermediates are polyfunctional, that is to say they have three or more reactive groups in the molecule, and their reactive groups are remote from each other in the molecule. They may, for instance, be separated from each other by 25 or 30 atoms or more on the average. They may be separated by 50 or 80 or 100 atoms or more. This type of polymer intermediate is quite distinct from the polyfunctional intermediates used hitherto in the manufacture of cross-linked resins. For example glycerol contains three hydroxyl groups and these hydroxyl groups are separated from each other merely by two carbon atoms. Similarly phenol has its reactive hydrogen atoms, in the ortho and para positions to the phenolic group, separated merely by three carbon atoms. Urea also has its reactive hydrogen atoms separated by three atoms, and melamine by five atoms. It will therefore be seen that the new polymer intermediates differ in kind from the polyfunctional intermediates hitherto used, and this difference in kind is reflected in the differences in properties of the polymers produced.

The chains or other type of link joining the reactive groups in the new intermediates may consist solely of carbon atoms but it is difficult to synthesise intermediates having the requisite length of carbon chain and accordingly it is preferred to employ chains or links consisting of carbon atoms with hetero atoms interposed.

Such hetero atoms may, for example, be oxygen atoms constituting an ether group, nitrogen atoms constituting a tertiary amino group, sulphur atoms constituting a thioether group or sulphur atoms carrying oxygen atoms constituting a sulphone group. It will be realised that such hetero atoms or groups should be unreactive under the conditions of subsequent polycondensation since otherwise the criterion that the reactive groups in the polymer intermediate should be remote from each other is not satisfied. For certain purposes, as more fully described below, such linking groups preferably have little or no polar or attractive character. Such non-attractive atoms or groups include the ether link, the thioether link and the tertiary amino group.

The reactive groups in the new polyfunctional polymer intermediates may be of any kind appropriate to the type of polymer to be produced, for example alcoholic hydroxyl groups, phenolic hydroxyl groups, primary or secondary amino groups, carboxylic groups and equivalents of such groups, for example formylamino groups, isocyano groups, carboxylic ester groups, for example methyl, ethyl or phenyl ester groups, ester groups obtained by esterification of an aliphatic or aromatic hydroxyl group with a volatile lower fatty acid, for example formic acid or acetic acid, and so forth.

Generally the new intermediates may be synthesised starting from polyfunctional reagents of a relatively simple character, e. g. similar to the polyfunctional reagents hitherto used in the production of cross-linked resins, by the continued action thereon of a simple bifunctional reagent, e. g. ethylene oxide or other alkylene oxide or of N-methyl ethylenimine or other N-alkylated, arylated or aralkylated alkylenimine. Generally the intermediates built up in this way may be represented by the formula

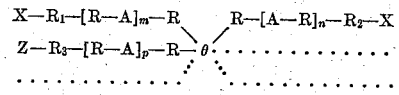

where $\theta$ represents the residue of the relatively simple polyfunctional reagent used as starting material, which may be called the core compound, A represents the link formed in each successive addition of the bifunctional reagent, R represents the divalent organic radicle derived from that bifunctional reagent, $R_1$, $R_2$ and $R_3$ are divalent organic radicles, and X, Y and Z are the terminal functional or reactive groups whilst $m$, $n$ and $p$ are integers. R may be the same or a different divalent radicle in different positions along the same chain or in different chains. As represented by dotted lines in the formula, the polymer intermediate may have more than three chains terminating in functional groups. When alkylene oxide is employed as the bifunctional reagent to build up the branch chains upon the core compound $\theta$, then the general formula for the polymer intermediate becomes

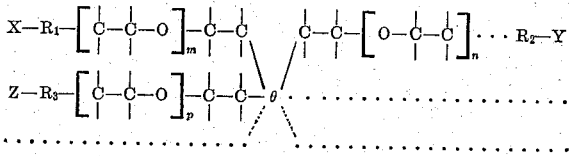

where $\theta$, $R_1$, $R_2$, $R_3$, X, Y and Z and $m$, $n$ and $p$ all have the same significance as before. If ethylene oxide is used as the bifunctional reagent for building up the chains then the open valencies of the carbon atoms shown in the formula are satisfied by hydrogen atoms. In any event such valencies must be satisfied by non-reactive atoms or groups, for example hydrogen atoms or hydrocarbon groups.

As already indicated, the core compounds for building up the new polymer intermediates may be relatively simple compounds. In building up the intermediates, reaction should preferably take place between the bifunctional reagent and the core compound at all replaceable hydrogen atoms of the latter reagent. Theoretically, one of such hydrogen atoms could remain unreacted and all the remaining hydrogen atoms be reacted and still produce a compound in which all the functional groups were remote from each other. In practice, however, this is not readily achieved and accordingly it is preferred to treat a core compound so that all its functionalities are reacted with the bifunctional reagent. The functional groups in the polyfunctional core compound are preferably all of the same character or substantially of the same character. For example they may all be hydroxyl groups or all primary or secondary amino groups. As suitable core compounds for building up the new polymer intermediates the following reagents may be mentioned, the number in brackets after each compound indicating the functionality of that compound for the purpose of the present invention: Glycerol (3); pentaglycerol (3); i. e. 2-methyl-2-methylol-1.3-propane diol from propionaldehyde and formaldehyde; erythritol (4); pentaerythritol (4) from acetaldehyde and formaldehyde; dipentaerythritol (6); sorbitol (6); mannitol (6) and similar polyhydroxy alcohols; mannitan (4); phloroglucinol (3); pyrogallol (3); 2.2.6.6-tetra-(γ-hydroxypropyl)-cyclohexanol (5) obtained by addition of four moles of acrolein to cyclohexanone followed by reduction of the product; 3.3.5.5.3'.3'.5'.5'-octa-(γ-hydroxypropyl)-4.4'-dihydroxy-dicyclohexyl (10) from dicyclohexanone by addition of eight moles of acrolein and reduction of the product; ammonia (3) or the equivalent triethanolamine or other trialkanolamine; diamines, triamines and other polyamies containing at least three replaceable hydrogen atoms, for example ethylene diamine (4), and other polymethylene diamines; triaminopropane (6); xylylene diamines (4); benzidine (4); tolidines (4); diethylene triamine (5); triethylene tetramine (6); tris-(β-amino-ethyl)-amine (6); tris-(γ-aminopropyl) - amine (6); N.N' - bis - (ε-amino-n-amyl)-pentamethylene diamine (6), cf. Example 5 of U. S. Patent No. 2,527,509; and melamine (6).

Such core compounds may be converted into new polymer intermediates by the continued action of a bifunctional reagent which will react with the functional groups of the core compound and leave a reactive group which can be further reacted with the bifunctional compound. Such bifunctional compounds include alkylene oxides such as ethylene oxide and N-substituted alkylenimines such as N-methyl-ethylenimine. In order that the functional groups of the resulting polymer intermediate shall be sufficiently remote from each other, a relatively large number of molecules of alkylene oxide or other bifunctional reagent have to be reacted with each molecule of the core compound. The minimum number of molecules of bifunctional reagent necessary may differ according to the functionality of the core compound. For example it is advisable to use at least 30 moles of alkylene oxide for each molecule of a trifunctional reagent (this makes an average of at least 60 atoms between the functional groups in addition to the small number of atoms between the functional groups in the original core compound), at least 40 moles for each mole of tetrafunctional reagent (an average of at least 60 atoms between the functional groups in addition to those present in the original core compound), and at least 60 moles for each mole of hexafunctional reagent (again an average of at least 60 atoms between the functional groups in addition to those present in the original core compound). The resulting compounds therefore have relatively high molecular weights. For example, starting from a trifunctional compound the minimum molecular weight which should be achieved in making the polymer intermediate is of the order of 1000 and the molecular weight is preferably 2000 or more, with a tetrafunctional reagent the minimum molecular weight is of the order of 1500–2000 and the molecular weight may be 3000 or more, and so on according to the functionality of the core compound. Neglecting the few atoms between the functional groups in the core compound, the average number $n$ of atoms between the functional groups in the new intermediate may be calculated from the number of moles $x$ of ethylene oxide or alkylene oxide and the functionality $F$ of the core compounds according to the following equation:

$$\frac{n}{2}=\frac{3x}{F}$$

and the number of moles of alkylene oxide to be used may be calculated from the equation $$x=\frac{nF}{6}$$

Using an alkylene oxide or an N-alkylated alkylenimine as the bifunctional reagent in the building up of the polymer intermediate, the terminal functional groups of such polymer intermediate are respectively hydroxyl and secondary amino groups. Either the hydroxyl groups or the secondary amino groups may, if desired, be converted into other terminal functional groups. For example they may be reacted with chloracetic acid or other mono-halogenated mono-carboxylic acid to give terminal carboxyl groups, or acrylonitrile or other α.β-unsaturated nitrile may be added to such terminal groups and the resulting compound reduced to produce a compound containing terminal primary amino groups. Again terminal hydroxyl groups may be replaced by halogen, e. g. by reaction with thionyl chloride, and the resulting polyhalide treated with sodium or other suitable cyanide and the product hydrolysed to the polycarboxylic acid or reduced to the polyamine. Such a polyhalide may also be reacted with the sodium or other salt of p-hydroxybenzoic acid or other aromatic hydroxycarboxylic acid to give a polymer intermediate whose functional groups are aromatic carboxylic groups. Various other similar conversions may be carried out to obtain any desired functional group at the ends of the chains of the polymer intermediates.

The new polymer intermediates may be used in a number of ways to produce polymers having new properties. They may be used, for example, in a relatively small proportion in a reaction mixture all of the other reagents of which are bifunctional reagents, so as to produce a polymer which is more penetrable by solvents or other liquids than the parent polymer produced from the bifunctional reagents alone. For this purpose it is preferable to use compounds containing no polar groups or containing only groups of low dipole moment in the chains or attached to the chains joining the reactive groups. The symbol A in the first of the above formulae may for this purpose represent the oxygen atom, the sulphur atom or a tertiary amino nitrogen atom.

Increase in the penetrability of polymers by aqueous or other liquids is of great importance in the production of highly crystalline polymers suitable for fibre formation. For example, it is well known that many high-melting aromatic polyesters the properties of which are eminently suitable for fibre formation have very low penetrability when in oriented fibre form, and as a result it is very difficult to dye them with any of the known dyestuffs without the assistance of powerful swelling agents. This possibly arises because of the comparative rigidity of the polymer molecules induced by the aromatic nuclei spaced along the polymer chain. However, a somewhat similar phenomenon is also encountered with the highly crystalline nylons which, though they can be dyed with wool dyestuffs, are not readily amenable to wool dyeing processes and in the result have largely been dyed with the dispersed insoluble type of dyestuff developed for acetate artificial silk. The incorporation of a relatively small proportion of the new polyfunctional polymer intermediates of the present invent appears to disrupt the crystalline structure of such highly crystalline polymers sufficiently to admit of their being dyed more readily by the customary dyeing processes. In particular cotton dyestuffs which generally have fairly large molecules may apparently enter the oriented polymers quite freely. If, as in a number of the polymer intermediates described above, tertiary amino groups are present, then the affinity of the polymer for wool dyestuffs is enhanced. In addition the affinity for the dispersed insoluble type of dyestuff is increased.

To achieve these results, relatively small proportions of the new polymer intermediates may be incorporated in the mixture for making the polymer, for example the polyamide or the polyester, or into the reaction mixture at some intermediate stage of the condensation. The molar proportion of such a polyfunctional intermediate may be less than 5% and preferably less than 2%. However, inasmuch as the molecular weight of the intermediate is comparatively high, the weight proportion on the total reaction mixture may be quite high, for example 10–20% or more. It is found that the incorporation of such a relatively high percentage by weight of the new intermediates does not substantially affect the melting point and hence the resulting polymer is still very valuable for forming a general purpose textile, e. g. it is resistant to common ironing temperatures, and furthermore such incorporation does not substantially affect the wearing, handle and other properties of textile filaments made from the polymers.

Generally either when using the new polymer intermediates in comparatively small proportion in a reaction mixture which consists predominantly of bifunctional reagents or when using the new polymer intermediates in higher proportions, e. g. for the production of polymers for use as plastics as described below, it is preferred to use a polyfunctional polymer intermediate having terminal groups which are the same as those of the bifunctional reagents present in such a mixture or the same as those present in some of such bifunctional reagents. For example, when condensing a dicarboxylic acid with a diamine or a glycol, a polyfunctional carboxylic acid of the present invention may be used, and when condensing a dicarboxylic acid with a diamine a polyfunctional amine may be used, and when condensing a dicarboxylic acid with a glycol a polyfunctional hydroxyl compound may be used. In the case of polyfunctional amino compounds, it is preferable that the amino groups should be of the same type as those present in the bifunctional reagents. For example, if the bifunctional reagents contain primary amino groups the polyfunctional reagent preferably also contains primary amino groups. This ensures that the reactive groups in the polyfunctional compound have substantially the same reactivity as those in the bifunctional reagents, and accordingly the polyfunctional reagent is distributed fairly uniformly in the polymer molecules. The same applies to carboxylic acid groups as between primary, secondary and tertiary aliphatic carboxylic acids and aromatic carboxylic acid groups.

As already indicated, the new polyfunctional polymer intermediates may be utilised in the production of the nylon type of polymer and of the aromatic polyester type of polymer for the production of polymers useful for fibre formation. The bifunctional constituents of mixtures for making such nylons may, for example, consist of polymethylene diamines and polymethylene dicarboxylic acids with or without small proportions of aromatic diamines or aromatic dicarboxylic acids. Such diamines include, for example, ethylene diamine, tetramethylene diamine, pentamethylene diamine, hexamethylene diamine, decamethylene diamine, benzidine and the like, whilst the dicarboxylic acids include glutaric acid, adipic acid, pimelic acid, suberic acid, azelaic acid, sebacic acid, terephthalic acid and the like. Again the bifunctional reagents to be used in the manufacture according to the present invention of aromatic polyesters include terephthalic acid with polymethylene glycols, para-xylylene glycol, bis-para-hydroxyethoxy-benzene and similar bis-hydroxyethyl derivatives of other diphenols; diphenyl-4.4'-dicarboxylic acid and $\alpha.\omega$-bis-(4-carboxyphenyl)-alkanes with polymethylene or other glycols, for example ethylene and propylene glycol; $\alpha.\beta$ - bis - (para-carboxyphenoxy)-alkanes with glycols, both straight chain and branched chain; 1.5-, 2.6- and 2.7-naphthalene dicarboxylic acids with the same glycols; and certain diphenols, for example hydroquinone and 4.4'-dihydroxy-diphenyl, with succinic or adipic or other aliphatic dicarboxylic acids.

A typical reaction mixture for forming a polyester according to the present invention may comprise 200 parts of dimethyl terephthalate, 100 parts of ethylene glycol, 20–40 parts of a new polymer intermediate having a molecular weight of 3000–4000 made by reaction of about 60–80 moles of ethylene oxide with 1 mole of anhydrous glycerol, and a small quantity of magnesium ribbon and of sodium methylate. Such a mixture may be heated first under reflux for about an hour up to a temperature of 250° C. and thereafter without a condenser for several hours at a temperature sufficiently high to maintain the mixture molten (and finally in the case of the mixture containing ethylene glycol under a low pressure such as 2 mms. of mercury), the heating being continued until the required molecular weight is attained.

The new polyfunctional polymer intermediates are not only of value as a small addition to predominantly bifunctional polymer-forming mixtures but may also be used in larger proportions to produce polymers suitable for extrusion, for moulding or for otherwise working into plastic masses or articles. As the proportion of polyfunctional reagent in the reaction mixture increases, solutions of the polymers become increasingly viscous. There is very little doubt that polymers so produced are actually cross-linked polymers but, unlike the cross-linked polymers of the prior art, can be dissolved or swollen by suitable solvents and can be extruded or moulded under pressure. These properties are almost certainly due to the very large size of the mesh of the network formed in the cross-linking. It is thought that the size of the mesh is so large as to admit of ready penetration by solvent molecules and hence of solution or very strong swelling by such solvents.

In making polymers from two types of reagent, for example a dicarboxylic acid and a glycol, either of the reagents may be progressively replaced by a polyfunctional reagent having the same type of reactive group according to the present invention, and as the proportion of polyfunctional reagent increases so the polymer becomes increasingly difficult to dissolve and its solutions increasingly viscous. If the mesh is sufficiently large, i. e. the functional groups of the polyfunctional intermediate are sufficiently far apart, then the whole of the one type of bifunctional reagent may be replaced by a polyfunctional reagent according to the invention. Again both types of bifunctional reagent may be replaced in part or wholly by the new type of polyfunctional reagent having the same reactive groups, and again if the reactive groups of such polyfunctional reagents are sufficiently far apart the product can be moulded or extruded. Moulded articles or extrusion products of such polymers appear to have greater rigidity and greater impact strength than corresponding linear polymers produced from bifunctional reagents. Here, however, the improvement in the properties of the product becomes progressively less as the distance between the functional groups of the polyfunctional reagent is increased. Again whereas many linear condensation polymers produced from bifunctional reagents, notably the nylons and the aromatic polyesters of the type mentioned above, have fairly sharp melting points, progressive replacement of their constituent monomers by the polyfunctional reagents of the present invention tends to increase the melting point and make it less sharp.

The invention may be applied to the production of polycondensation products of many types, for example polyesters and polyamides as already mentioned, polyester-amides, polyformals, polyaminotriazoles and so forth. The polycondensation conditions to be employed are similar to those employed in polycondensations with purely bifunctional reagents. Thus, for example, in polyesterifications temperatures of the order of 200–250° may be used, especially in the early stages, and in the later stages still higher temperatures, for example 250–300° C. In these later stages it is desirable to carry out the reaction under low pressure, for example a pressure of the order of 2 mms. of mercury or less, in order to remove the volatile by-product, which may be a volatile monohydroxy compound such as methanol, ethanol, or phenol, or a volatile glycol such as ethylene glycol. The esterification is preferably continued until a product having fibre-forming properties is produced. For this purpose the reagents, if substantially non-volatile under the reaction conditions, should be employed in such proportions that there are substantially equal numbers of hydroxy and carboxy groups or their equivalents in the reaction mixture. Where one of the reagents is volatile, for example a glycol, and is allowed to evaporate during the reaction, that reagent should be employed in excess so as to bring about reaction between equal moles of the two reagents. Catalysts, particularly ester-interchange catalysts, for example alkali metals, alkali metal alkoxides and magnesium, may be employed, e. g. in cases where carboxylic groups are present in the reaction mixtures in the form of their esters with volatile monohydroxy compounds.

Polyamidations may be carried out under much the same conditions. They do not usually require a catalyst or a reduction to very low pressure towards the end of the polycondensation. Again the final temperature conditions are not usually so high as in polyesterifications. They should, however, be sufficiently high, when carrying out the polycondensation in absence of a solvent, to keep the reaction mixture fluid.

The following examples illustrate the invention both as regards the production of the new intermediates and as regards the production of polymers therefrom. In all cases the parts are by weight.

*Example 1.—Preparation of tetrol with remote functional groups*

1 part of pentaerythritol, 30 parts (46 molar proportions) of cyclic ethylene carbonate and .04 part of potassium carbonate were heated for 6 hours at 200° C. Throughout the heating carbon dioxide was evolved and the loss in weight was just over 98% of the theoretical. The product was a pale brown, very viscous liquid, a polyethanoxy pentaerythritol having a molecular weight of about 2000.

It therefore had the formula

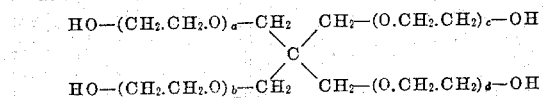

$a+b+c+d$ being about 46. The average number of atoms between the reactive groups was (by calculation) 72.

*Example 2.—Preparation of a tetrol with more remote functional groups*

Example 1 was repeated using 55 parts of cyclic ethylene carbonate (about 80 molar proportions). The weight loss was about 93% of the theoretical after 3 hours heating and was nearly theoretical at the conclusion of the heating. The product, another polyethanoxy pentaerythritol, was thick and treacly and almost colourless. Its molecular weight was about 4000. Its formula was the same as that given in Example 1 except that $a+b+c+d$ was about 80 and the average number of atoms between its reactive groups was 123.

*Example 3.—Preparation of polymer*

38 parts of dimethyl terephthalate, 19.4 parts of ethylene glycol (1.5 moles relative to the terephthalate) and 3.8 parts of the tetrol made according to Example 1 (.01 mole relative to the terephthalate) were heated with 10 parts by weight of a sodium methoxide catalyst formed by dissolving sodium in methyl alcohol and with a small amount of magnesium ribbon. The clear, slightly yellow melt was heated at 190° C. for 2½ hours, at the end of which time the theoretical amount of methanol had been lost. Heating was continued at 280° for 11 hours. At the end of this period there was no sign of gelling and the melt was quite viscous. Polymerisation was continued for a further 5 hours at 280° C. under an absolute pressure of 5 mms. of mercury. The product was extremely tough, of good colour and gave fibres having very good cold-drawing properties. Its melting point was 234° C. The product was more readily dyed than a similar product made from dimethyl terephthalate and ethylene glycol alone.

To show the different effect obtained with the tetrol having remote functional groups, a trial was carried out using pentaerythritol itself instead of the polyethanoxy pentaerythritol. In this trial 1 mole of dimethyl terephthalate, 1.5 moles of ethylene glycol and .01 mole of pentaerythritol were heated at 280° C. Inside 5 hours the reaction product was becoming gas-blown and showed no signs of fluidity. Heating was continued for a further hour at 280° C. under high vacuum. The product, which adhered very strongly to the reactor, was rather rubbery, heterogeneous in appearance in that it was partly opaque and partly translucent, and showed no sign of melting at 300° C. This was in marked contrast to the fibre-forming polymer obtained using the polyethanoxy pentaerythritol.

*Example 4*

38.8 parts of dimethyl terephthalate, 18.6 parts of ethylene glycol (nearly 1.5 moles based on the terephthalate) and 3.656 parts of the tetrol obtained according to Example 2 (.005 mole based on the terephthalate) were heated with ester-interchange catalysts as in Example 3 for 2 hours at 180° C. and then for 6 hours at 280° C. There was no sign of gelling. Treatment was continued for a further 5½ hours at 280° C. at an absolute pressure of 0.5 mm. of mercury. The product was ivory white, had a melting point of 238° C. and gave fibres with good cold-drawing properties.

Having described my invention, what I desire to secure by Letters Patent is:

1. A fibre-forming condensation polymer selected from the class consisting of polyesters and polyamides, said polyesters being formed by the condensation of at least one compound selected from the class consisting of saturated and aromatic dicarboxylic acids, saturated and aromatic glycols and saturated and aromatic hydroxy monocarboxylic acids and their ester-forming derivatives, there being present compounds containing both carboxyl and hydroxyl groups or their ester-forming derivatives, together with a minor proportion of a compound containing, as the only reactive groups, more than two groups selected from the class consisting of carboxyl and hydroxyl groups and their ester-forming derivatives, the said groups being separated from each other by saturated chains of average length at least 25 atoms, the natures and relative numbers of the said reactive groups in the reactants taken as a whole being such that substantially all the linkages in the final product are ester linkages; and said polyamides being formed by the condensation of at least one compound selected from the class consisting of saturated and aromatic dicarboxylic acids, saturated and aromatic diamines and saturated and aromatic amino monocarboxylic acids and their amide-forming derivatives, there being present compounds containing both carboxyl and amine groups and their amide-forming derivatives, together with a minor proportion of a compound containing, as the only reactive groups, more than two groups selected from the class consisting of carboxyl and amine groups and their amide-forming derivatives, the said groups being separated from each other by saturated chains of average length at least 25 atoms, the natures and relative numbers the said reactive groups in the reactants taken as a whole being such that substantially all the linkages in the final product are amide linkages.

2. A fibre-forming condensation polymer selected from the class consisting of polyesters and polyamides, said polyesters being formed by the condensation of at least one compound selected from the class consisting of saturated and aromatic dicarboxylic acids, and saturated and aromatic glycols and saturated and aromatic hydroxy monocarboxylic acids and their ester-forming derivatives, there being present compounds containing both carboxyl and hydroxyl groups or their ester-forming derivatives, together with a minor proportion of a compound containing, as the only reactive groups, more than two groups selected from the class consisting of carboxyl and hydroxyl groups and their ester-forming derivatives, the said groups being separated from each other by alkanoxy chains of average length at least 50 atoms, the natures and relative numbers of the said reactive groups in the reactants taken as a whole being such that substantially all the linkages in the final product are ester linkages; and said polyamides being formed by the condensation of at least one compound selected from the class consisting of saturated and aromatic dicarboxylic acids, saturated and aromatic diamines and saturated and aromatic amino monocarboxylic acids and their amide-forming derivatives, there being present compounds containing both carboxyl and amine groups and their amide-forming derivatives, together with a minor proportion of a compound containing, as the only reactive groups, more than two groups selected from the class consisting of carboxyl and amine groups and their amide-forming derivatives, the said groups being separated from each other by alkanoxy chains of average length at least 50 atoms, the natures and relative numbers the said reactive groups in the reactants taken as a whole being such that substantially all the linkages in the final product are amide linkages.

3. A fibre-forming polyester comprising the condensation product of a polymethylene glycol and an aromatic dicarboxylic acid whose carboxyl groups are each directly joined to an aromatic nucleus, and are separated by at least 4 carbon atoms in the aromatic nucleus to which each carboxyl group is attached, together with a minor proportion of a compound containing, as the only reactive groups, more than two ester-forming groups, the said groups being separated from each other by saturated chains of average length at least 25 atoms.

4. A fibre-forming polyester comprising the condesation product of terephthalic acid, ethylene glycol, and a minor proportion of a compound containing, as the only reactive groups, more than two hydroxyl groups, the said groups being separated from each other by saturated chains of average length at least 25 atoms.

5. A fibre-forming polyester derived from terephthalic acid, ethylene glycol and a polyethanoxy penta-erythritol in which the functional hydroxy groups are separated from each other by chains of average length at least 25 atoms.

6. A polyester according to claim 5 wherein the polyethanoxy compound is present in a proportion not exceeding 1 mole percent based on the terephthalic acid.

7. A fibre-forming polyamide comprising the condensation product of at least one compound containing only two amide-forming groups selected from the class consisting of carboxyl and amine groups and their amide-forming derivatives, there being present compounds containing both carboxyl and amine groups or their amide-forming derivatives, together with a minor proportion of a compound containing, as the only reactive groups, more than two amide-forming groups separated from each other by alkanoxy chains of average length at least 50 atoms.

8. Process for the production of fibre-forming polymers from the class consisting of polyesters and polyamides, which comprises, for the polyesters, condensing until a fibre-forming product has been formed, at least one compound selected from the class consisting of saturated and aromatic dicarboxylic acids, saturated and aromatic glycols and saturated and aromatic hydroxy monocarboxylic acids and their ester-forming derivatives, there being present compounds containing both carboxyl and hydroxyl groups or their ester-forming derivatives, together with a minor proportion of a compound containing, as the only reactive groups, more than two groups selected from the class consisting of carboxyl and hydroxyl groups and their ester-forming derivatives, the said groups being separated from each other by saturated chains of average length at least 25 atoms, the natures and relative numbers of the said reactive groups in the reactants taken as a whole being such that substantially all the linkages in the final product are ester linkages; and which comprises, for the polyamides, condensing, until a fibre-forming product has been formed, at least one compound selected from the class consisting of saturated and aromatic dicarboxylic acids, saturated and aromatic diamines and saturated and aromatic amino monocarboxylic acids and their amide-forming derivatives, there being present compounds containing both carboxyl and amine groups and their amide-forming derivatives, together with a minor proportion of a compound containing, as the only reactive groups, more than two groups selected from the class consisting of carboxyl and amine groups and their amide-forming derivatives, the said groups being separated from each other by saturated chains of average length at least 25 atoms, the natures and relative numbers the said reactive groups in the reactants taken as a whole being such that substantially all the linkages in the final product are amide linkages.

9. Process for the production of fibre-forming polymers from the class consisting of polyesters and polyamides, which comprises, for the polyesters, condensing, until a fibre-forming product has been formed, at least one compound selected from the class consisting of saturated and aromatic dicarboxylic acids, saturated and aromatic glycols and saturated and aromatic hydroxy monocarboxylic acids and their ester-forming derivatives, there being present compounds containing both carboxyl and hydroxyl groups or their ester-forming derivatives, together with a minor proportion of a compound containing, as the only reactive groups, more than two groups selected from the class consisting of carboxyl and hydroxyl groups and their ester-forming derivatives, the said groups being separated from each other by alkanoxy chains of average length at least 50 atoms, the natures and relative numbers of the said reactive groups in the reactants taken as a whole being such that substantially all the linkages in the final product are ester linkages; and which comprises, for the polyamides, condensing, until a fibre-forming product has been formed, at least one compound selected from the class consisting of saturated and aromatic dicarboxylic acids, saturated and aromatic diamides and saturated and aromatic amino monocarboxylic acids and their amide-forming derivatives, there being present compounds containing both carboxyl and amine groups and their amide-forming derivatives, together with a minor proportion of a compound containing, as the only reactive groups, more than two groups selected from the class consisting of carboxyl and amine groups and their amide-forming derivatives, the said groups being separated from each other by alkanoxy chains of average length at least 50 atoms, the natures and relative numbers the said reactive groups in the reactants taken as a whole being such that substantially all the linkages in the final product are amide linkages.

10. Process for the production of new polymers, which comprises condensing an aromatic compound selected from the group consisting of aromatic dicarboxylic acids and their ester-forming derivatives, with a polymethylene glycol and a small proportion of a polyhydroxy compound containing more than 2 functional hydroxy groups, said functional hydroxy groups being separated from each other by chains of average length at least 25 atoms.

11. Process for the production of new fibre-forming polymers, which comprises condensing an aromatic compound selected from the group consisting of aromatic dicarboxylic acids and their ester-forming derivatives, with a polymethylene glycol and at most 2 molar percent based on said aromatic compound of a polyhydroxy compound containing more than 2 functional hydroxy groups, said functional hydroxy groups being separated from each other by chains of average length at least 50 atoms.

12. Process according to claim 11 wherein said aromatic compound is one whose carboxy groups are directly linked to an aromatic nucleus and which has at least 4 atoms in each aromatic nucleus between the carboxy groups.

13. Process for the production of new fibre-forming polymers, which comprises condensing a compound selected from the group consisting of terephthalic acid and its ester-forming derivatives, with ethylene glycol and a small proportion of a polyhydroxy compound containing more than 2 functional hydroxy groups, said functional hydroxy groups being separated from each other by chains of average length at least 50 atoms.

14. Process for the production of new fibre-forming polymers, which comprises condensing an aromatic compound selected from the group consisting of terephthalic acid and its ester-forming derivatives, with ethylene glycol and at most 2 molar percent based on said aromatic compound of a polyethanoxy penta-erythritol in which the functional hydroxy groups are separated from each other by chains of average length at least 50 atoms.

15. Process for the manufacture of fibre-forming polyamides, which comprises condensing at least one compound containing, as the only reactive groups, two amide-forming groups selected from the class consisting of carboxyl and amine groups and their amide-forming derivatives, there being present compounds containing both carboxyl and amine groups or their amide-forming derivatives, with a minor proportion of a compound containing, as the only reactive groups, more than two amide-forming groups separated from each other by alkanoxy chains of average length at least 50 atoms, the natures and relative numbers of the amide-forming groups in the reactants taken as a whole being such that substantially all the linkages in the final product are amide linkages.

References Cited in the file of this patent

UNITED STATES PATENTS

| | | |
|---|---|---|
| 1,922,459 | Schmidt et al. | Aug. 15, 1933 |
| 2,524,046 | Flory | Oct. 3, 1950 |
| 2,572,085 | Wittcoff et al. | Oct. 23, 1951 |
| 2,626,912 | De Groote | Jan. 27, 1953 |
| 2,626,935 | De Groote | Jan. 27, 1953 |
| 2,652,424 | De Groote | Sept. 15, 1953 |